United States Patent
Wu et al.

(10) Patent No.: US 11,109,365 B2
(45) Date of Patent: Aug. 31, 2021

(54) COMMUNICATION METHOD, TERMINAL, AND NETWORK DEVICE FOR REPEATING UPLINK CONTROL INFORMATION TO OBTAIN DATA SEGMENT

(71) Applicant: Huawei Technologies Co., Ltd., Shenzhen (CN)

(72) Inventors: Dan Wu, Chengdu (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 14 days.

(21) Appl. No.: 16/674,239

(22) Filed: Nov. 5, 2019

(65) Prior Publication Data

US 2020/0077384 A1 Mar. 5, 2020

Related U.S. Application Data

(63) Continuation of application No. PCT/CN2018/085651, filed on May 4, 2018.

(30) Foreign Application Priority Data

May 5, 2017 (CN) .......................... 201710313853.4

(51) Int. Cl.
*H04W 72/04* (2009.01)
*H04L 27/26* (2006.01)
(52) U.S. Cl.
CPC ..... *H04W 72/0413* (2013.01); *H04L 27/2604* (2013.01)
(58) Field of Classification Search
CPC ....... H04L 5/00; H04L 27/26; H04L 27/2602; H04L 27/2604; H04L 27/2636;
(Continued)

(56) References Cited

U.S. PATENT DOCUMENTS

2013/0128821 A1* 5/2013 Hooli .................... H04L 5/0035
370/329
2015/0208366 A1* 7/2015 Papasakellariou .......................
H04W 52/0212
370/311
(Continued)

FOREIGN PATENT DOCUMENTS

CN 101227261 A 7/2008
CN 101247166 A 8/2008
(Continued)

OTHER PUBLICATIONS

"On UCI Repetition," 3GPP TSG-RAN WG1 Meeting #88bis, Spokane, USA, R1-1706045, pp. 1-2, 3rd Generation Partnership Project, Valbonne, France (Apr. 3-7, 2017).
(Continued)

*Primary Examiner* — Mewale A Ambaye
(74) *Attorney, Agent, or Firm* — Leydig, Voit & Mayer, Ltd.

(57) ABSTRACT

This application provides a communication method, a terminal, and a network device. The communication method includes: repeating, by a first terminal, to-be-transmitted uplink control information for N times to obtain a first data segment, where N is a positive integer; determining, by the first terminal, an orthogonal cover code based on N; multiplying, by the first terminal, the first data segment by the orthogonal cover code to obtain a second data segment; and sending, by the first terminal, the second data segment. By using the communication method, the terminal, and the network device provided in this application, frequency diversity gains of the uplink control information can be
(Continued)

increased, transmission flexibility of the uplink control information can be improved, and resource utilization can be increased.

17 Claims, 9 Drawing Sheets

(58) Field of Classification Search
CPC ..... H04L 5/007; H04L 5/0019; H04L 5/0037; H04L 5/0053; H04L 72/0413
See application file for complete search history.

(56) References Cited

U.S. PATENT DOCUMENTS

| | | | |
|---|---|---|---|
| 2015/0381396 A1* | 12/2015 | Chen | H04J 13/16 370/254 |
| 2016/0337157 A1* | 11/2016 | Papasakellariou | H04B 3/232 |
| 2017/0347394 A1* | 11/2017 | Yasukawa | H04L 1/1896 |
| 2017/0366380 A1 | 12/2017 | Hwang et al. | |
| 2018/0176892 A1 | 6/2018 | Kim et al. | |
| 2019/0229843 A1* | 7/2019 | Yoshimoto | H04L 1/0072 |
| 2019/0253200 A1* | 8/2019 | Salem | H04W 74/0816 |

FOREIGN PATENT DOCUMENTS

| | | |
|---|---|---|
| CN | 106165510 A | 11/2016 |
| WO | 2007073093 A2 | 6/2007 |
| WO | 2016093573 A1 | 6/2016 |

OTHER PUBLICATIONS

"Description of PUSCH-like PUCCH format with CDM," 3GPP TSG RAN WG1 #82bis, Malmo, Sweden, R1-156308, pp. 1-6, 3rd Generation Partnership Project, Valbonne, France (Oct. 5-9, 2015).
"Design of long NR-PUCCH format," 3GPP TSG RAN WG1 Meeting #88bis, Spokane, USA, XP051243044, R1-1704909, pp. 1-7, 3rd Generation Partnership Project, Valbonne, France (Apr. 3-7, 2017).
"sPUCCH design for HARQ-ACK feedback with shortened TTI length," 3GPP TSG RAN WG1 Meeting #86, Gothenburg, Sweden, XP051125603, R1-166860, pp. 1-7, 3rd Generation Partnership Project, Valbonne, France (Aug. 22-26, 2016).
"WF on Long Duration NR-PUCCH Structure," 3GPP TSG RAN WG1 #88bis, Spokane, USA, XP051252751, R1-1706519, pp. 1-7, 3rd Generation Partnership Project, Valbonne, France (Apr. 3-7, 2017).

* cited by examiner

COMMUNICATION METHOD, TERMINAL, AND NETWORK DEVICE FOR REPEATING UPLINK CONTROL INFORMATION TO OBTAIN DATA SEGMENT

CROSS-REFERENCE TO RELATED APPLICATIONS

This application is a continuation of International Application No. PCT/CN2018/085651, filed on May 4, 2018, which claims priority to Chinese Patent Application No. 201710313853.4, filed on May 5, 2017. The disclosures of the aforementioned applications are hereby incorporated by reference in their entireties.

TECHNICAL FIELD

This application relates to the communications field, and more specifically, to a communication method, a terminal, and a network device.

BACKGROUND

In a new radio (NR) communications system, uplink control information (UCI) of different lengths can be transmitted using physical uplink control channels (PUCCH) of different formats.

Currently, it has been defined for the NR communications system that uplink control information with a length of 1 or 2 bits can be transmitted still using long term evolution (LTE) PUCCH format 1a/1b, and that uplink control information with a length greater than X bits can be transmitted still using LTE PUCCH format 4, where a value of X is to be determined.

For uplink control information with a length between 2 and X (including X) bits, although a unified transmission method has been proposed for the NR communications system, there is no conclusion on how transmission is performed.

SUMMARY

This application provides a communication method, a terminal and a network device, to transmit uplink control information, so that frequency gains of the uplink control information can be increased, transmission flexibility of the uplink control information can be improved, and resource utilization can be increased.

According to a first aspect, a communication method is provided. The communication method includes: repeating, by a first terminal, to-be-transmitted uplink control information for N times to obtain a first data segment, where N is a positive integer; determining, by the first terminal, an orthogonal cover code based on N; multiplying, by the first terminal, the first data segment by the orthogonal cover code to obtain a second data segment; and sending, by the first terminal, the second data segment.

The first terminal repeats the to-be-transmitted uplink control information for N times, so that frequency diversity gains of the to-be-transmitted uplink control information can be increased.

In addition, the first terminal multiplies the to-be-transmitted uplink control information by the orthogonal cover code, so that the to-be-transmitted uplink control information can present a comb-like structure in frequency domain. In addition, the comb-like structure can be staggered from a frequency-domain comb-like structure obtained by multiplying uplink control information of another terminal by an orthogonal cover code, so that a plurality of terminals use a same time-frequency resource to transmit uplink control information, thereby increasing resource utilization.

In addition, a quantity of repetitions of uplink control information of a terminal and an orthogonal cover code can be determined flexibly, so that the uplink control information can be transmitted more flexibly.

With reference to the first aspect, in a first possible implementation, the determining, by the first terminal, an orthogonal cover code based on N includes: determining, by the first terminal, the orthogonal cover code based on the quantity N of repetitions and a correspondence between the quantity N of repetitions and the orthogonal cover code.

In other words, different quantities of repetitions correspond to different orthogonal cover codes, so that when different terminals use a same resource to send uplink control information, quantities of repetitions of the uplink control information of the different terminals may be different. This can improve transmission flexibility of the uplink control information.

With reference to the first aspect or the first possible implementation, in a second possible implementation, the communication method further includes: receiving, by the first terminal, indication information sent by a network device, where the indication information is used to indicate N; and determining, by the first terminal, N based on the indication information.

In the implementation, the quantity of repetitions of the uplink control information of the terminal is determined by the network device. Because the network device can learn communication information of a plurality of terminals, the network device can determine a proper quantity of repetitions for each terminal, thereby increasing the resource utilization.

With reference to the first aspect or the first possible implementation, in a third possible implementation, the communication method further includes: determining, by the first terminal, N based on uplink signal quality.

With reference to the first aspect or the first possible implementation, in a fourth possible implementation, the communication method further includes: determining, by the first terminal, N based on a quantity M of symbols represented by constellation points of the to-be-transmitted uplink control information, where M is a positive integer.

With reference to the fourth possible implementation, in a fifth possible implementation, the determining, by the first terminal, N based on a quantity M of symbols represented by constellation points of the to-be-transmitted uplink control information includes: determining, by the first terminal, a ratio of a quantity of subcarriers included in a first resource to M as N.

With reference to either of the third possible implementation or the fifth possible implementation, in a sixth possible implementation, the communication method further includes: sending, by the first terminal, indication information to a network device, where the indication information is used to indicate N.

When the quantity of repetitions is determined by the terminal, the terminal sends the quantity of repetitions to the network device, so that the network device can receive the uplink control information of the terminal based on the quantity of repetitions, thereby increasing efficiency of the network device.

With reference to any one of the first aspect or the first to the sixth possible implementations, in a seventh possible implementation, the sending, by the first terminal, the second data segment includes: sending, by the first terminal on a first resource, the second data segment, where a third data segment is also sent on the first resource, and the third data segment is obtained by repeating uplink control information of a second terminal for K times, where K is not equal to N, and K is a positive integer.

When different terminals use a same resource to send uplink control information, quantities of repetitions of the different terminals may be different. This can improve transmission flexibility of the uplink control information and resource utilization.

According to a second aspect, a communication method is provided. The communication method includes: receiving, by a network device, a second data segment sent by a first terminal, where the second data segment is obtained by the first terminal by processing a first data segment based on an orthogonal cover code, and the first data segment is obtained by repeating uplink control information of the first terminal for N times, where N is a positive integer; determining, by the network device, a conjugated orthogonal cover code based on N; multiplying, by the network terminal, the conjugated cover code by the second data segment to obtain the first data segment; and performing, by the network device, N rounds of deduplication processing on the first data segment to obtain the uplink control information of the first terminal.

The first terminal repeats the to-be-transmitted uplink control information for N times, so that frequency diversity gains of the to-be-transmitted uplink control information can be increased. In addition, the first terminal multiplies the to-be-transmitted uplink control information by the orthogonal cover code, so that the to-be-transmitted uplink control information can present a comb-like structure in frequency domain. In addition, the comb-like structure can be staggered from a frequency-domain comb-like structure obtained by multiplying uplink control information of another terminal by an orthogonal cover code, so that a plurality of terminals use a same time-frequency resource to transmit uplink control information.

With reference to the second aspect, in a first possible implementation, the determining, by the network device, a conjugated orthogonal cover code based on N includes: determining, by the network device, the conjugated orthogonal cover code based on N and a correspondence between the quantity N of repetitions and the conjugated orthogonal cover code.

In other words, different quantities of repetitions correspond to different orthogonal cover codes, so that when different terminals use a same resource to send uplink control information, quantities of repetitions of the uplink control information of the different terminals may be different. This can improve transmission flexibility of the uplink control information.

With reference to the second aspect or the first possible implementation, in a second possible implementation, the communication method further includes: receiving, by the network device, indication information sent by the first terminal, where the indication information is used to indicate N.

With reference to the second aspect or the first possible implementation, in a third possible implementation, the communication method further includes: determining, by the network device, N based on at least one of uplink channel state information of the first terminal and an uplink channel signal-to-noise ratio of the first terminal; and sending, by the network device, indication information to the first terminal, where the indication information is used to indicate N.

In the implementation, the quantity of repetitions of the uplink control information of the terminal is determined by the network device. Because the network device can learn communication information of a plurality of terminals, the network device can determine a proper quantity of repetitions for each terminal, thereby increasing resource utilization.

With reference to the second aspect or the first to the third possible implementations, in a fourth possible implementation, the receiving, by a network device, a second data segment sent by a first terminal includes: receiving, by the network device on a first resource, the second data segment sent by the first terminal; and the communication method further includes: receiving, by the network device on the first resource, a third data segment sent by a second terminal; and performing, by the network device, conjugated orthogonal cover code processing and K rounds of deduplication processing on the third data segment to obtain uplink control information of the second terminal, where K is not equal to N, and K is a positive integer.

When different terminals use a same resource to send uplink control information, quantities of repetitions of the different terminals may be different. This can improve transmission flexibility of the uplink control information and resource utilization.

According to a third aspect, this application provides a terminal. The terminal includes a module configured to perform the communication method according to any one of the first aspect or the possible implementations of the first aspect.

According to a fourth aspect, this application provides a network device. The network device includes a module configured to perform the communication method according to any one of the second aspect or the possible implementations of the second aspect.

According to a fifth aspect, this application provides a terminal. The terminal includes a processor and a transmitter. The processor is configured to execute code. When the processor executes the code, the processor and the transmitter implement the communication method according to any one of the first aspect or the possible implementations of the first aspect.

Optionally, the terminal may further include a memory, configured to store the code executed by the processor. The terminal may further include a receiver, configured to receive information sent by another device.

According to a sixth aspect, this application provides a network device. The network device includes a processor and a receiver. The processor is configured to execute code. When the processor executes the code, the processor and the receiver implement the communication method according to any one of the first aspect or the possible implementations of the first aspect.

Optionally, the network device may further include a memory, configured to store the code executed by the processor. The network device may further include a transmitter, configured to send information to another device.

According to a seventh aspect, this application provides a computer-readable storage medium. The computer-readable storage medium stores program code executed by a terminal, and the program code includes an instruction used to perform the communication method according to any one of the first aspect or the possible implementations of the first aspect.

According to an eighth aspect, this application provides a computer-readable storage medium. The computer-readable storage medium stores program code executed by a network device, and the program code includes an instruction used to perform the communication method according to any one of the first aspect or the possible implementations of the first aspect.

According to a ninth aspect, this application provides a computer program product including an instruction. When the computer program product runs on a terminal, the terminal performs the communication method according to any one of the first aspect or the possible implementations of the first aspect.

According to a tenth aspect, this application provides a computer program product including an instruction. When the computer program product runs on a network device, the network device performs the communication method according to any one of the first aspect or the possible implementations of the first aspect.

DESCRIPTION OF EMBODIMENTS

The following describes technical solutions of this application with reference to accompanying drawings.

Figure 1:
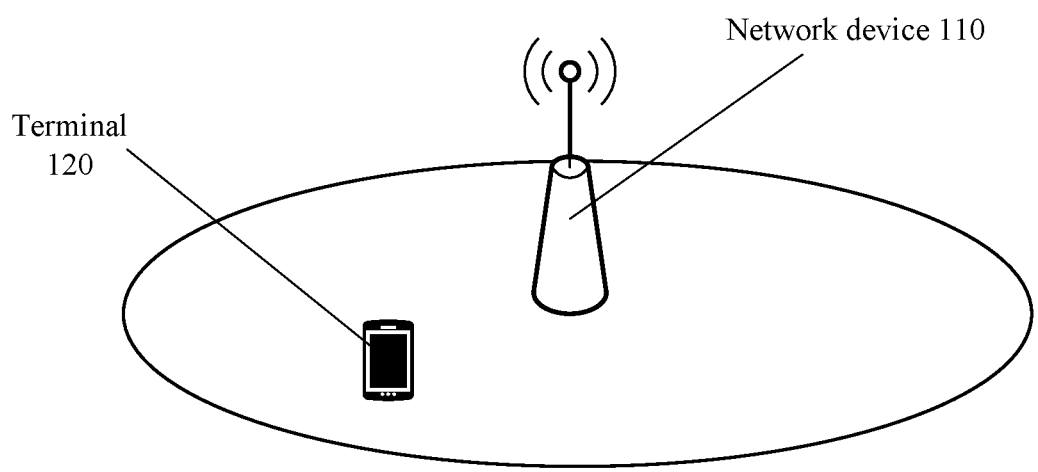
FIG. 1 is an example structural diagram of a communications system to which a communication method in an embodiment of this application is applicable.

FIG. 1 is an example structural diagram of a communications system to which a communication method in an embodiment of this application is applicable. It should be understood that a system architecture is not limited to that shown in FIG. 1 in the embodiments of this application. In addition, an apparatus in FIG. 1 may be hardware, may be software obtained through function division, or may be a combination thereof. A specific example of the communications system shown in FIG. 1 may be an LTE system or an NR system, where the NR system may also be referred to as a 5 G system.

A network device 110 in FIG. 1 may be a base station. It should be understood that a specific type of the base station is not limited in the embodiments of this application. In systems using different radio access technologies, a device having a function of a base station may have different names. For ease of description, in all the embodiments of this application, the apparatuses providing a wireless communication function for terminals are collectively referred to as base stations, such as a base station device and a small cell device (Pico) in a future network.

A terminal 120 in FIG. 1 may be a user equipment (UE). The UE may communicate with one or more core networks through a radio access network (RAN). The terminal may also be referred to as an access terminal, a terminal device, a subscriber unit, a subscriber station, a mobile station, a mobile console, a remote station, a remote terminal, a mobile device, a user terminal, a wireless network device, a user agent, or a user apparatus. The terminal may be a cellular phone, a cordless phone, a session initiation protocol (SIP) phone, a wireless local loop (WLL) station, a personal digital assistant (PDA), a handheld device with a wireless communication function, a computing device, another device connected to a wireless modem, a vehicle-mounted device, a wearable device, a terminal device in an internet of things or an internet of vehicles, a terminal device of any form in a future network, or the like.

In the communications system shown in FIG. 1, the network device 110 and the terminal 120 communicate with each other. For example, the terminal 120 may send UCI to the network device 110 over a PUCCH, and correspondingly, the network device 110 receives the UCI sent by the terminal 120, to implement other uplink-downlink transmission between the terminal 120 and the network device 110.

Specifically, the UCI sent by the terminal 120 to the network device may include hybrid automatic repeat request (HARQ) acknowledgement (ACK) information, channel state information (CSI), scheduling request information, and/or the like.

A correspondence between a quantity of repetitions and an orthogonal cover code may be configured in the terminal 120. Each quantity of repetitions may correspond to a plurality of orthogonal cover codes. A correspondence between a quantity of repetitions and a conjugation of an orthogonal cover code may also be configured in the terminal 120. A conjugation of an orthogonal cover code may be referred to as a conjugated orthogonal cover code.

For example, a quantity of repetitions M may correspond to M orthogonal cover codes, and the M orthogonal cover codes may be:

$$[1, 1, 1, \ldots 1], \left[1, e^{j\frac{2}{M}\pi}, e^{j\frac{4}{M}\pi}, \ldots e^{j\frac{2(M-1)}{M}\pi}\right],$$

$$\left[1, e^{j\frac{4}{M}\pi}, e^{j\frac{8}{M}\pi}, \ldots e^{j\frac{4(M-1)}{M}\pi}\right], \ldots,$$

$$\text{and } \left[1, e^{j\frac{2(M-1)}{M}\pi}, e^{j\frac{4(M-1)}{M}\pi}, \ldots e^{j\frac{2(M-1)^2}{M}\pi}\right].$$

Specifically, four orthogonal cover codes corresponding to a quantity 4 of repetitions include: [1,1,1,1], [1,j,−1 j], [1,−1,1,−1], and [1,−j,−1,−j]. Two orthogonal cover codes corresponding to a quantity of repetitions 2 include: [1,1], and [1,j].

The correspondence between a quantity of repetitions and an orthogonal cover code, or the correspondence between a quantity of repetitions and a conjugation of an orthogonal cover code may be configured in the network device 110. A conjugation of an orthogonal cover code may be referred to as a conjugated orthogonal cover code. Similarly, each quantity of repetitions may correspond to a plurality of orthogonal cover codes or a plurality of conjugated orthogonal cover codes.

Usually, if the correspondence between a quantity of repetitions and an orthogonal cover code is configured in the network device 110, the correspondence may be the same as the correspondence between a quantity of repetitions and an orthogonal cover code that is configured in the terminal 120; and if the correspondence between a quantity of repetitions and a conjugated orthogonal cover code is configured in the network device 110, the conjugated orthogonal cover code may be a conjugation of the orthogonal cover code in the terminal.

Figures 2, 3:
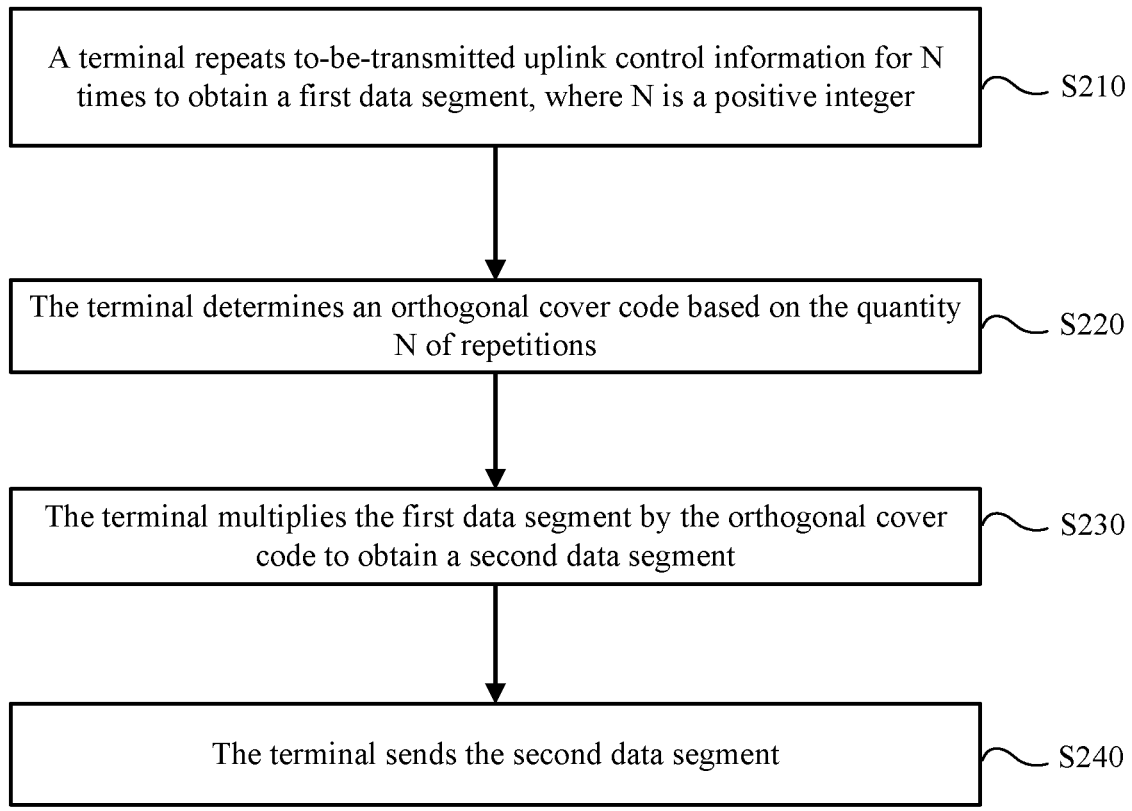
FIG. 2 is an example flowchart of a communication method according to an embodiment of this application.
FIG. 3 is an example diagram of a frequency-domain comb-like structure of uplink control information according to an embodiment of this application.

FIG. 2 is a schematic flowchart of a communication method performed by a terminal. It should be understood that FIG. 2 shows steps or operations of the communication method, but these steps or operations are only examples. In this embodiment of this application, other operations or variations of the operations in FIG. 2 may also be performed. In addition, the steps in FIG. 2 may be performed in a sequence different from that presented in FIG. 2, and not all the operations in FIG. 2 are necessarily performed.

S210: The terminal repeats to-be-transmitted uplink control information for N times to obtain a first data segment, where N is a positive integer.

Specifically, the repeating, by the terminal, to-be-transmitted uplink control information for N times may include: repeating, by the terminal for N times, a symbol that is represented by a constellation point and obtained by modulating the to-be-transmitted uplink control information. For example, if three symbols represented by constellation points are obtained by modulating the to-be-transmitted uplink control information, 12 symbols represented by the constellation points are obtained by repeating the three symbols represented by the constellation points for four times, where the 12 symbols represented by the constellation points are a first data segment.

The symbol, represented by the constellation point, of the to-be-transmitted uplink control information may be a quadrature phase shift keying (QPSK) symbol obtained by performing QPSK modulation on the to-be-transmitted uplink control information; or may be a binary phase shift keying (BPSK) symbol obtained by performing BPSK modulation on the to-be-transmitted uplink control information.

If a quantity of subcarriers used by a physical uplink control channel that carries the uplink control information of the terminal 120 is determined, the terminal may determine a quantity of encoded bits of the uplink control information of the terminal 120 based on the quantity of subcarriers and a quantity of repetitions.

For example, if the quantity of subcarriers used by the physical uplink control channel that carries the uplink control information of the terminal 120 is 12, the quantity of repetitions of the uplink control information is 2, and a modulation scheme used by the terminal 120 is QPSK, it indicates that a quantity of QPSK symbols available before the uplink control information of the terminal 120 is repeated is 6. Further, because every two encoded bits can be modulated into one QPSK symbol, it indicates that the quantity of the encoded bits of the uplink control information is 12.

S220: The terminal determines an orthogonal cover code based on the quantity N of repetitions.

Specifically, the terminal may determine the orthogonal cover code corresponding to N, based on N and a correspondence between the quantity of repetitions and the orthogonal cover code that is configured in the terminal.

For example, if orthogonal cover codes corresponding to a quantity 4 of repetitions configured in the terminal include [1,j,−1 j], the terminal may obtain the orthogonal cover code [1,j,−1 j] based on N=4 and the correspondence.

Optionally, if a plurality of orthogonal cover codes are determined by the terminal 120 based on the quantity N of repetitions, the terminal 120 may further determine, based on an orthogonal cover code index sent by the network device 110, an orthogonal cover code corresponding to the index from the plurality of orthogonal cover codes corresponding to the quantity N of repetitions.

It should be noted that a sequence for performing S210 and S220 is not limited in this embodiment of this application. For example, S220 may be performed before S210.

S230: The terminal multiplies the first data segment by the orthogonal cover code to obtain a second data segment.

In other words, the terminal multiplies the first data segment obtained in S210 by the orthogonal cover code obtained in S220, to obtain the second data segment. Terminals multiply the data segments obtained through repetition by orthogonal cover codes, so that frequency domain data of the uplink control information is arranged in a staggered manner on a carrier, allowing the plurality of terminals to use a same resource to transmit their respective uplink control information.

For example, three QPSK symbols obtained by repeating three QPSK symbols of the to-be-transmitted uplink control information for the first time may be multiplied by 1 in the orthogonal cover code [1,j,−1 j]; three QPSK symbols obtained by repeating the three QPSK symbols for the second time is multiplied by j in the orthogonal cover code [1,j,−1 j]; three QPSK symbols obtained by repeating the three QPSK symbols for the third time is multiplied by −1 in the orthogonal cover code [1,j,−1 j]; and three QPSK symbols obtained by repeating the three QPSK symbols for the fourth time is multiplied by −j in the orthogonal cover code [1,j,−1 j]. Finally, a result obtained by multiplying the 12 QPSK symbols by the orthogonal cover code [1,j,−1 j] is the second data segment.

Terminals multiply the data segments obtained through repetition by orthogonal cover codes, so that frequency domain data of the uplink control information is arranged in a staggered manner on a carrier, allowing the plurality of terminals to use a same resource to transmit their respective uplink control information.

For example, there are four terminals: a terminal 1, a terminal 2, a terminal 3, and a terminal 4. To-be-transmitted uplink control information of each terminal includes three QPSK symbols. Each terminal repeats the respective three QPSK symbols for four times to obtain 12 QPSK symbols. Orthogonal cover codes of the four terminals correspond to [1,1,1,1], [1,j,−1 j], [1,−1,1,−1], and [1,−j,−1,−j]. Each terminal multiplies its QPSK symbols by the corresponding orthogonal cover code, and performs DFT processing to obtain a frequency-domain comb-like structure shown in FIG. 3. It may be seen from FIG. 3 that the frequency-domain comb-like structures of the four terminals are arranged in a staggered manner without any conflict.

S240: The terminal sends the second data segment.

Figure 4:
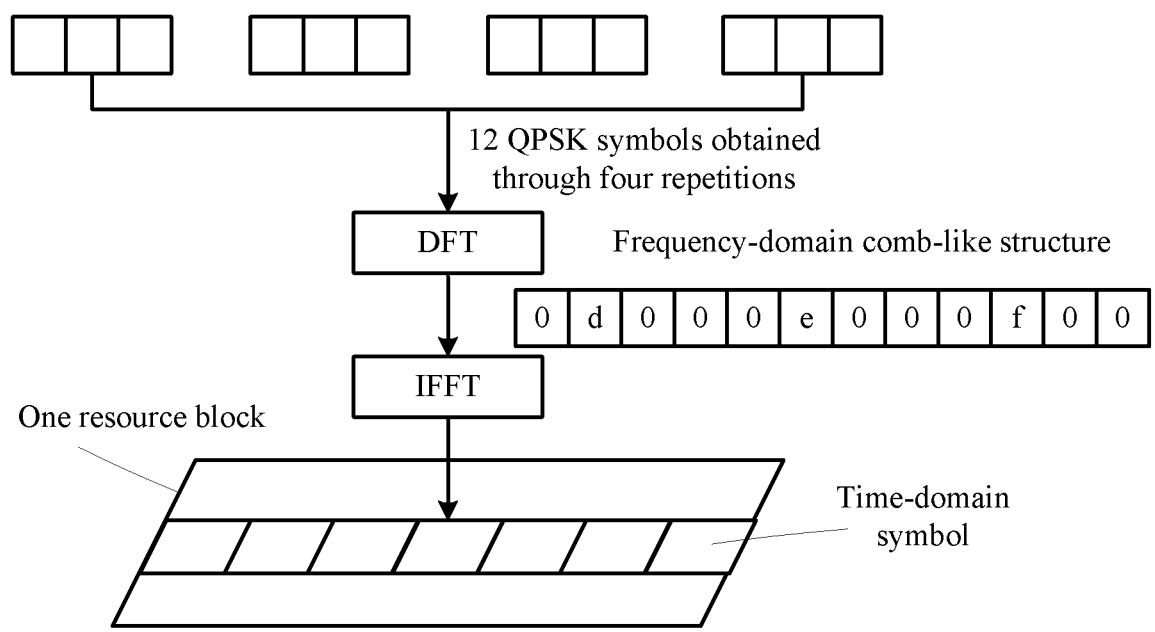
FIG. 4 is an example flowchart of a communication method according to another embodiment of this application.

As shown in FIG. 4, the sending, by the terminal, the second data segment may specifically include: performing discrete fourier transform (DFT) on the second data segment; mapping data obtained through the DFT to a resource corresponding to an uplink control channel, which may be specifically mapping the data obtained through the DFT to a subcarrier corresponding to the uplink control channel; performing inverse fast fourier transform on data obtained through mapping, to obtain time domain data; and sending the time domain data.

In the communication method shown in FIG. 2, optionally, the quantity N of repetitions may be determined by the terminal, or may be obtained by the terminal from the network device.

When the terminal determines the quantity N of repetitions, specifically, the terminal may determine the quantity N of repetitions based on uplink channel state information, or the terminal may determine the quantity N of repetitions based on a quantity M of symbols represented by constellation points of the to-be-transmitted uplink control information.

When the terminal determines the quantity N of repetitions based on the uplink channel state information, a better signal quality indicated by the uplink channel state information indicates a greater quantity of repetitions.

For example, when the uplink signal quality of the terminal is greater than a threshold, the quantity of repetitions is determined as 8; or when the uplink signal quality of the terminal is less than the threshold, the quantity of repetitions is determined as 2.

The terminal determines the quantity of repetitions of the to-be-transmitted uplink control information based on the uplink state information, so that the terminal can properly use a resource to transmit the uplink control information.

The terminal may perform channel sounding by using a downlink reference signal, and obtain the uplink channel state information based on uplink-downlink channel reciprocity.

It should be understood that the terminal may alternatively determine the quantity of repetitions based on information of another terminal, and this is not limited in this application.

The determining, by the terminal, the quantity N of repetitions based on a quantity M of symbols represented by constellation points of the to-be-transmitted uplink control information may specifically include: determining, by the terminal, a ratio of a quantity of subcarriers included in a first resource to M as N, where the first resource is a resource used by the uplink control channel that carries the to-be-transmitted uplink control information.

For example, when the quantity of subcarriers included in the first resource is 12, that is, the first resource includes 12 subcarriers, and the quantity of symbols, represented by constellation points, of the to-be-transmitted uplink control information is 3, a result 4 obtained by dividing 12 by 3 may be determined as the quantity of repetitions of the three symbols, represented by constellation points, of the to-be-transmitted uplink control information.

When the terminal determines the quantity N of repetitions, the terminal may send indication information to the network device, where the indication information indicates the quantity N of repetitions, so that the network terminal can receive the uplink control information of the terminal based on the quantity N of repetitions.

The obtaining, by the terminal, the quantity N of repetitions from the network device may specifically include: receiving, by the terminal, indication information sent by the network device, where the indication information indicates the quantity N of repetitions; and determining, by the terminal, the quantity N of repetitions based on the indication information.

In the communication method shown in FIG. 2, optionally, the quantity N of repetitions of uplink control information of the terminal, whether determined by the terminal or determined by the network device for the terminal, may be different from a quantity of repetitions of uplink control information of another terminal.

For example, three terminals use a same resource to send their respective uplink control information. A quantity of repetitions of to-be-transmitted uplink control information of the first terminal may be 2, and quantities of repetitions of to-be-transmitted uplink control information of the second terminal and the third terminal may both be 4. In this case, an orthogonal cover code of the first terminal may be [1,1], an orthogonal cover code of the second terminal may be [1,j,−1 j], and an orthogonal cover code of the third terminal may be [1,−j,−1,j].

Figure 5:
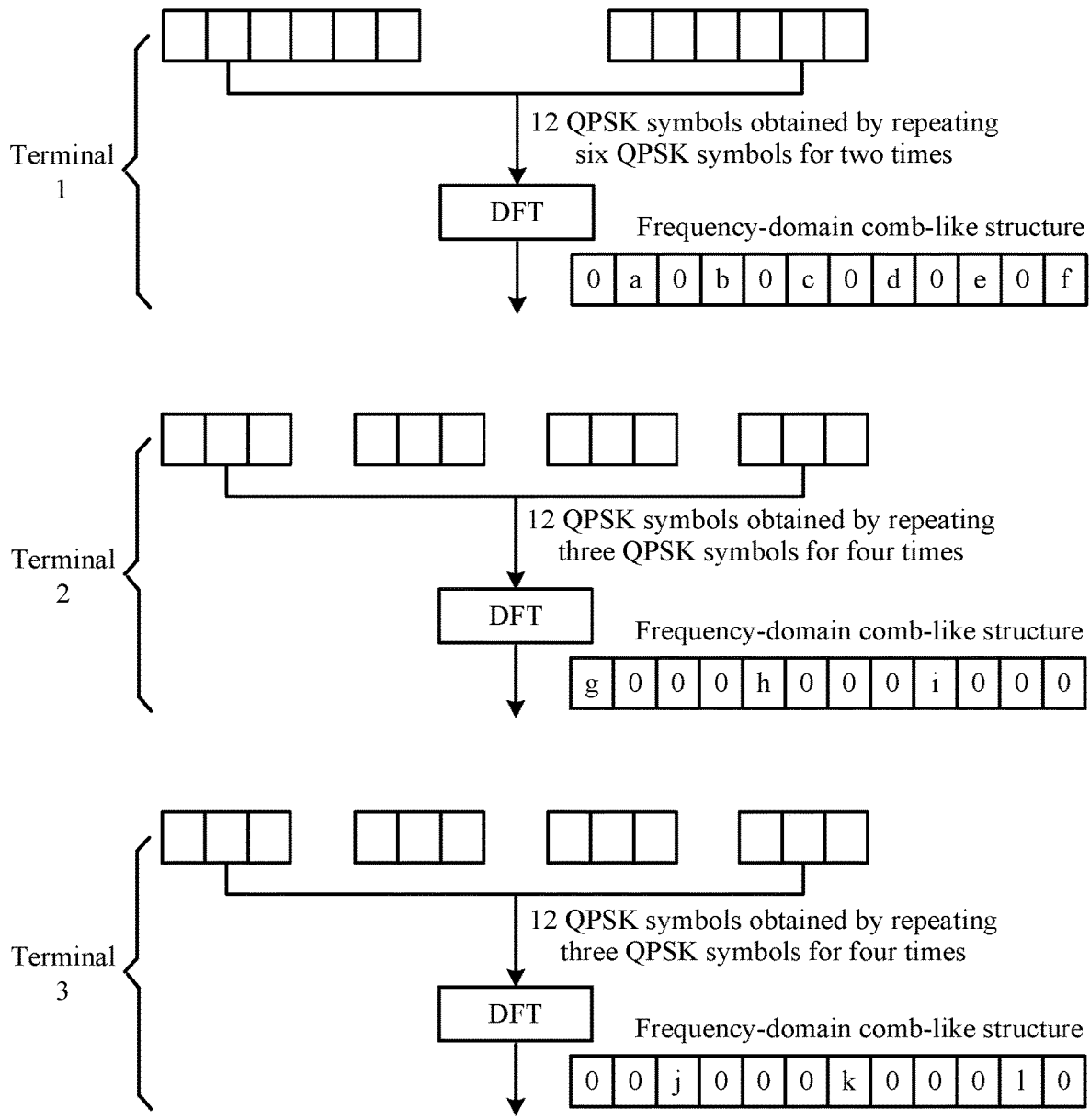
FIG. 5 is an example diagram of a frequency-domain comb-like structure of uplink control information according to another embodiment of this application.

When the to-be-transmitted uplink control information of the first terminal includes six QPSK symbols, and the to-be-transmitted uplink control information of the second terminal and the third terminal each includes three QPSK symbols, a diagram of frequency-domain comb-like structures obtained by the three terminals by repeating their respective QPSK symbols of the to-be-transmitted uplink control information for the corresponding times and multiplying respective obtained QPSK symbols by the corresponding orthogonal cover codes is shown in FIG. 5.

It can be seen from the FIG. 5 that although the quantities of repetitions of the uplink control information of the three terminals are different, their respective comb-like structures of the uplink control information are arranged in a staggered manner without any conflict.

Figure 6:
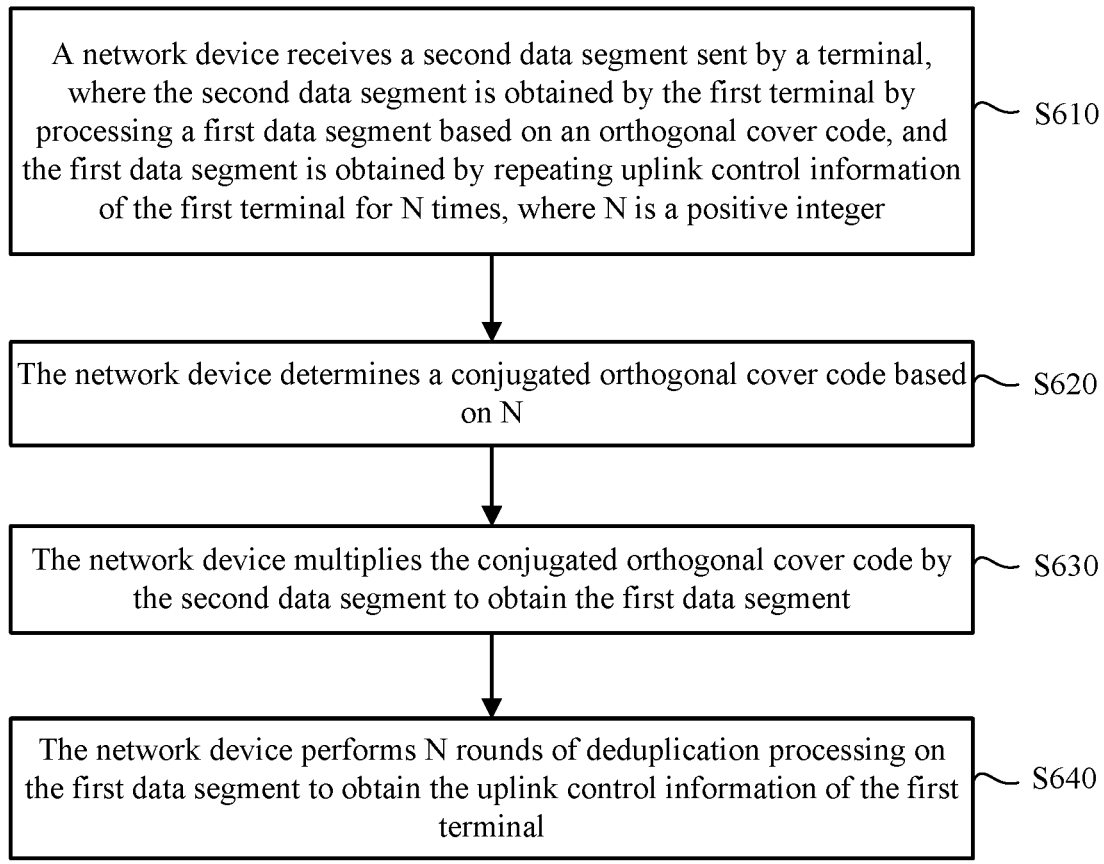
FIG. 6 is an example flowchart of a communication method according to another embodiment of this application.

FIG. 6 is a schematic flowchart of a communication method performed by a network device. It should be understood that FIG. 6 shows steps or operations of the communication method, but these steps or operations are only examples. In this embodiment of this application, other operations or variations of the operations in FIG. 6 may also be performed. In addition, the steps in FIG. 6 may be performed in a sequence different from that presented in FIG. 6, and not all the operations in FIG. 6 are necessarily performed.

S610: The network device receives a second data segment sent by a terminal, where the second data segment is obtained by the first terminal by processing a first data segment based on an orthogonal cover code, and the first data segment is obtained by repeating uplink control information of the first terminal for N times, where N is a positive integer.

In other words, the second data segment received by the network device may be the second data segment sent by the terminal in S240.

The receiving, by the network device, a second data segment may specifically include: receiving time domain data sent by the terminal; performing fast fourier transformation (FFT) on the time domain data, extracting data on a subcarrier corresponding to an uplink control resource, and performing channel equalization; and performing DFT on the equalized data to obtain the second data segment.

If a quantity N of repetitions of the terminal corresponds to a plurality of orthogonal cover codes, the network device 110 may further determine, from the plurality of orthogonal cover codes, an orthogonal cover code that should be used after the terminal 120 repeats the uplink control information for N times. Usually, the network device 110 may send indication information to the terminal 120, to indicate an index of an orthogonal cover code in the plurality of orthogonal cover codes corresponding to the quantity N of repetitions.

If a plurality of terminals use a same resource to send their respective uplink control information, and quantities of repetitions of the terminals are the same, orthogonal cover codes determined by the network device 110 for the different terminals should be different as much as possible. In this way, the uplink control information of the plurality of terminals is arranged on the same resource in a staggered manner without any collusion, thereby improving communication reliability.

S620: The network device determines a conjugated orthogonal cover code based on N.

Specifically, the network device may determine an orthogonal cover code corresponding to N based on N and a correspondence between a quantity of repetitions and an orthogonal cover code that is configured in the network device; and then determine a conjugation of the orthogonal cover code as the conjugated orthogonal cover code.

Optionally, if the quantity N of repetitions corresponds to a plurality of orthogonal cover codes, the network device may find the plurality of orthogonal cover codes corresponding to the quantity N of repetitions, based on N and a correspondence between a quantity of repetitions and an orthogonal cover code that is configured in the network device; determine one orthogonal cover code from the plurality of orthogonal cover codes based on an index of an orthogonal cover code used by the terminal; and determine a conjugation of the orthogonal cover code as a conjugated orthogonal cover code.

Alternatively, the network device may determine the conjugated orthogonal cover code corresponding to N, based on N and a correspondence between a quantity of repetitions and a conjugated orthogonal cover code that is configured in the network device.

Optionally, when the quantity N of repetitions corresponds to a plurality of conjugated orthogonal cover codes, the network device may find the plurality of conjugated orthogonal cover codes corresponding to the quantity N of repetitions based on a correspondence between a quantity of repetitions and a conjugated orthogonal cover code, and then determine one conjugated orthogonal cover code from the plurality of conjugated orthogonal cover codes based on an index of an orthogonal cover code used by the terminal 120.

It should be noted that a sequence for performing S610 and S620 is not limited in this embodiment of this application.

S630: The network device multiplies the conjugated orthogonal cover code by the second data segment to obtain the first data segment.

Specifically, the network device multiplies the second data segment obtained in S610 by the conjugated orthogonal cover code obtained in S620 to obtain the first data segment. For example, the network device may obtain a first data segment including 12 symbols represented by constellation points.

S640: The network device performs N rounds of deduplication processing on the first data segment to obtain the uplink control information of the first terminal.

If N is 4, four rounds of deduplication processing are performed on the first data segment including 12 symbols represented by constellation points, to obtain three symbols represented by constellation points. The three symbols represented by constellation points are symbols, represented by constellation points, of the uplink control information.

After that, the network device may demodulate the deduplicated symbols represented by constellation points, and decode data obtained through demodulation, to obtain the uplink control information.

In the communication method shown in FIG. 6, the quantity N of repetitions may be determined by the network device, or may be obtained from the terminal.

When the network device determines the quantity N of repetitions, the network device may determine the quantity of repetitions based on uplink channel state information and/or an uplink channel signal-to-noise ratio of the terminal.

For example, when the CSI of the terminal is greater than a threshold, the quantity of repetitions is determined as 8; or when the signal-to-noise ratio of the terminal is less than the threshold, the quantity of repetitions is determined as 2.

The network device determines the quantity of repetitions of the uplink control information of the terminal based on the information about the terminal, so that the terminal can properly use a resource to transmit the uplink control information.

It should be understood that the network device may alternatively determine the quantity N of repetitions based on information about another terminal, for example, CSI or a signal-to-noise ratio of the another terminal, or a quantity of repetitions of the another terminal, so that the terminals can properly use a same resource to transmit their respective uplink control information.

When the network device determines the quantity N of repetitions, the network device may further send indication information to the terminal, to indicate the quantity of repetitions, so that the terminal can send the uplink control information based on the quantity of repetitions. Optionally, the network device may send the indication information to the terminal by using system information, higher layer signaling, or the like; or may send the indication information by using downlink control information (DCI).

If the quantity N of repetitions corresponds to a plurality of orthogonal cover codes, the network device may further send, to the terminal, an index of an orthogonal cover code that should be used by the terminal among the plurality of orthogonal cover codes corresponding to the quantity N of repetitions, so that the terminal can determine the orthogonal cover code based on the index.

The obtaining, by the network device, the quantity N of repetitions from the terminal may include: receiving, by the network device, indication information sent by the terminal, where the indication information indicates the quantity N of repetitions.

In the communication method in FIG. 6, optionally, the network device may determine different quantities of repetitions for different terminals sending uplink control information on a same resource, so as to fully utilize the resource and increase resource utilization.

For example, the network device receives, on a resource, uplink control information of a plurality of terminals, where a quantity of repetitions of uplink control information of a terminal is N, a quantity of repetitions of uplink control information of another terminal is K, and K is not equal to N.

The following describes some embodiments of the communication method of this application in detail with reference to the terminal 120 and the network 110 in FIG. 1.

Figure 7:
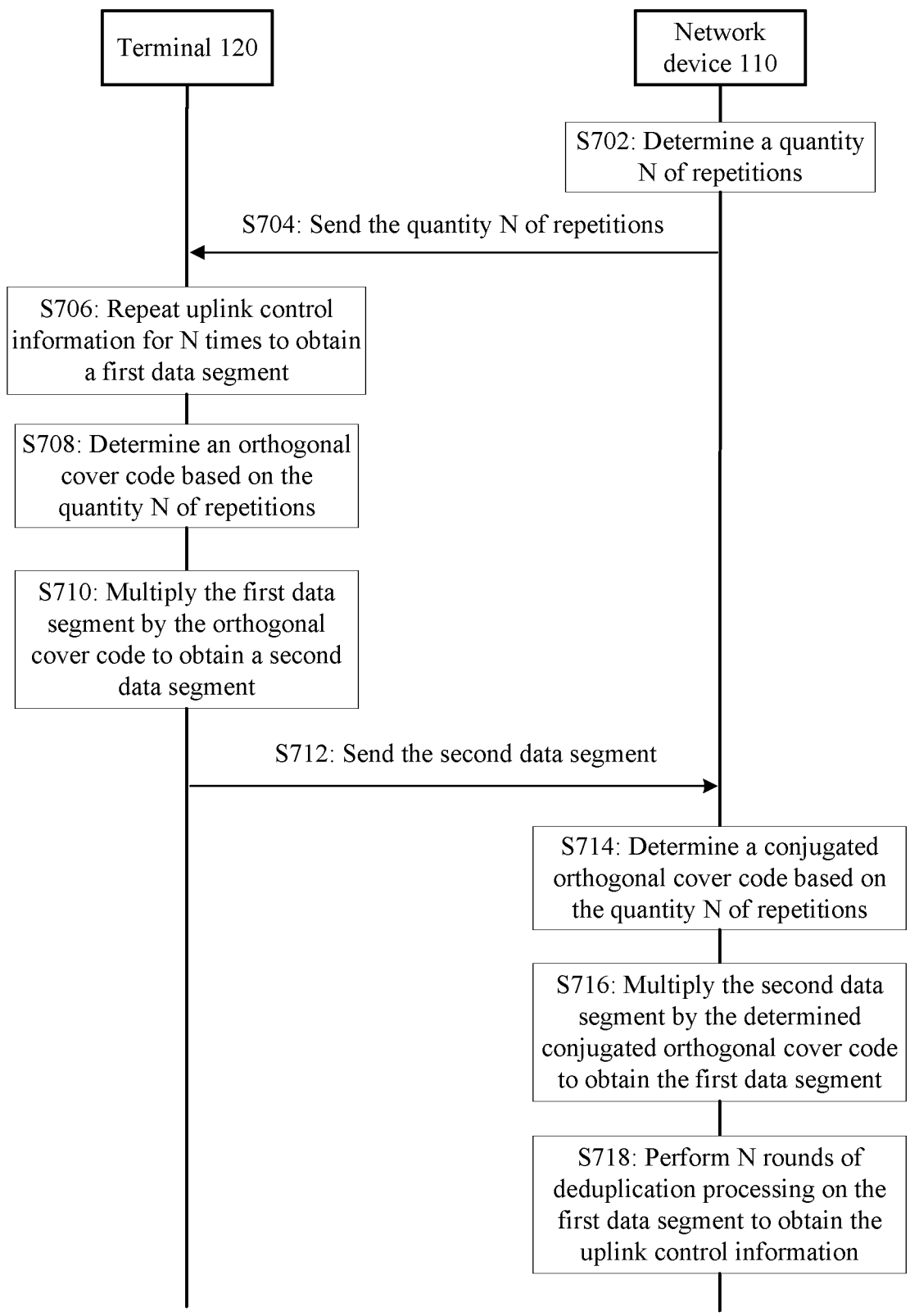
FIG. 7 is an example flowchart of a communication method according to another embodiment of this application.

FIG. 7 is a schematic flowchart of an embodiment of uplink control information communication between the terminal 120 and the network device 110. It should be understood that FIG. 7 shows steps or operations of the communication method, but these steps or operations are only examples. In this embodiment of this application, other operations or variations of the operations in FIG. 7 may also be performed. In addition, the steps in FIG. 7 may be performed in a sequence different from that presented in FIG. 7, and not all the operations in FIG. 7 are necessarily performed.

S702: When the terminal 120 sends uplink control information, the network device 110 determines a quantity N of repetitions of the uplink control information.

For an implementation in which the network device 110 determines the quantity N of repetitions of the uplink control information of the terminal 120, refer to the implementation in which the network device determines the quantity N of repetitions of the uplink control information of the terminal in the communication method shown in FIG. 6. Details are not described herein again.

If the quantity N of repetitions of the terminal corresponds to a plurality of orthogonal cover codes, the network device 110 may further determine, from the plurality of orthogonal cover codes, an orthogonal cover code that should be used after the terminal 120 repeats the uplink control information for N times. Usually, the network device 110 may send indication information to the terminal 120, to indicate an index of an orthogonal cover code in the plurality of orthogonal cover codes corresponding to the quantity N of repetitions.

S704: The network device 110 sends the indication information to the terminal 120, to indicate the quantity N of repetitions. Correspondingly, the terminal 120 receives the indication information.

Optionally, the network device may send the indication information to the terminal by using system information, higher layer signaling, or the like; or may send the indication information by using DCI.

S706: After receiving the indication information indicating the quantity N of repetitions, the terminal 120 may repeat the uplink control information for N times to obtain a first data segment.

For a specific implementation in which the terminal 120 repeats the uplink control information for N times to obtain the first data segment, refer to S210 in the communication method shown in FIG. 2. Details are not described herein again.

For example, a quantity of encoded bits of the uplink control information of the terminal 120 is 6. Then three QPSK symbols can be obtained by the terminal 120 by performing QPSK modulation on the encoded bits.

If the quantity N of repetitions is 4, 12 QPSK symbols are obtained by repeating the three QPSK symbols for four times.

S708: The terminal 120 determines an orthogonal cover code based on the quantity N of repetitions. For this step, refer to S220 in the communication method shown in FIG. 2. Details are not described herein again.

It should be noted that a sequence of S706 and S708 is not limited in this embodiment of this application. For example, S208 may be performed before S206.

S710: The terminal 120 multiplies the first data segment obtained in S706 by the orthogonal cover code obtained in S208 to obtain a second data segment. For this step, refer to S230 in the communication method shown in FIG. 2. Details are not described herein again.

S712: The terminal 120 sends the second data segment. Correspondingly, the network device 110 receives the second data segment.

For a specific implementation in which the terminal 120 sends the second data segment, refer to S240 in the communication method shown in FIG. 2. For a specific implementation in which the network device 110 receives the second data segment, refer to S610 in the communication method shown in FIG. 6. Details are not described herein again.

S714: The network device 110 determines a conjugated orthogonal cover code based on the quantity N of repetitions of the uplink control information of the terminal 120.

For this step, refer to S620 in the communication method shown in FIG. 6. Details are not described herein again.

S716: Multiply the second data segment by the conjugated orthogonal cover code to obtain the first data segment. For this step, refer to S630 in the communication method shown in FIG. 6. Details are not described herein again.

S718: The network device 110 performs N rounds of deduplication processing on the first data segment to obtain the uplink control information. For this step, refer to S640 in the communication method shown in FIG. 6. Details are not described herein again.

Figure 8:
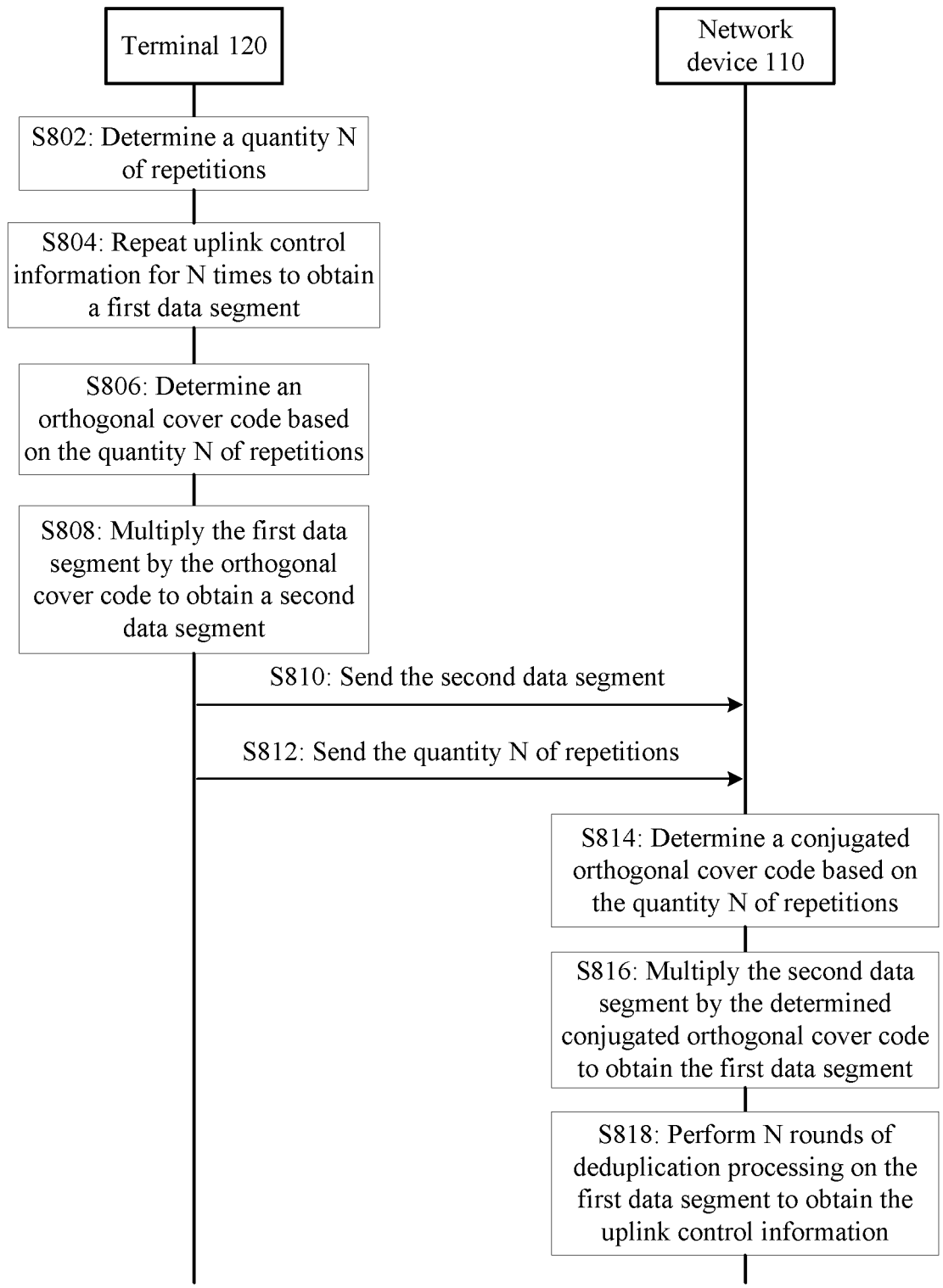
FIG. 8 is an example flowchart of a communication method according to another embodiment of this application.

FIG. 8 is a schematic flowchart of another embodiment of uplink control information communication between the terminal 120 and the network device 110. It should be understood that FIG. 8 shows steps or operations of the communication method, but these steps or operations are only examples. In this embodiment of this application, other operations or variations of the operations in FIG. 8 may also be performed. In addition, the steps in FIG. 8 may be performed in a sequence different from that presented in FIG. 8, and not all the operations in FIG. 8 are necessarily performed.

S802: The terminal 120 determines a quantity N of repetitions of uplink control information. For this step, refer to the specific implementation in which the terminal determines the quantity of repetitions in the communication method shown in FIG. 2. Details are not described herein again.

For example, when uplink signal quality of the terminal 120 is greater than a threshold, the quantity of repetitions is determined as 8; or when the uplink signal quality of the terminal 120 is less than the threshold, the quantity of repetitions is determined as 2.

The terminal 120 determines the quantity of repetitions of the uplink control information of the terminal based on information about the terminal, so that the terminal can properly use a resource to transmit the uplink control information.

S804: The terminal 120 repeats the uplink control information for N times to obtain a first data segment. For this step, refer to S210. Details are not described herein again.

S806: The terminal 120 determines an orthogonal cover code based on the quantity N of repetitions. For this step, refer to S220. Details are not described herein again.

It should be noted that a sequence of S804 and S806 is not limited in this embodiment of this application. For example, S806 may be performed before S804.

S808: The terminal 120 multiplies the first data segment by the orthogonal cover code obtained in S806 to obtain a second data segment. For this step, refer to S230. Details are not described herein again.

S810: The terminal 120 sends the second data segment. For this step, refer to S240. Details are not described herein again.

Correspondingly, the network device 110 receives the second data segment. For this step, refer to S610. Details are not described herein again.

S812: The terminal 120 sends indication information indicating the quantity N of repetitions. Correspondingly, the network device 110 receives the indication information. The terminal 120 may send the indication information by using higher layer signaling.

Optionally, the terminal 120 may further send an index of the orthogonal cover code used by the terminal 120 in a plurality of orthogonal cover codes corresponding to the quantity N of repetitions.

It should be noted that a sequence of S812 is not limited in this embodiment of this application. For example, S812 may be performed anytime after S802.

S814: The network device 110 determines the quantity N of repetitions based on the indication information, and determines, based on the quantity N of repetitions, a conjugated orthogonal cover code corresponding to the quantity N of repetitions.

For a specific implementation in which the network device 110 determines the conjugated orthogonal cover code based on the quantity N of repetitions, refer to S620. Details are not described herein again.

S816: The network device 110 multiplies the second data segment by the determined conjugated orthogonal cover code to obtain the first data segment. For this step, refer to S630. Details are not described herein again.

S818: The network device 110 performs N rounds of deduplication processing on the first data segment to obtain the uplink control information. For this step, refer to S640. Details are not described herein again.

For example, the first data segment includes 12 QPSK symbols. Then three QPSK symbols can be obtained through four rounds of deduplication processing.

In the communication method shown in FIG. 2 or FIG. 6, optionally, if many terminals use a same resource to transmit their respective uplink control information, or a terminal transmits uplink control information of a relatively great length, or frequency diversity gains of uplink control information of a terminal need to be increased (that is, the uplink control information is repeated for many times), frequency domain resources can be added.

Further embodiments of this application are provided in the following. It should be noted that the numbering used in the following section does not necessarily need to comply with the numbering used in the previous sections.

Embodiment 1

A communication method, comprising:
multiplying three QPSK symbols obtained by repeating three QPSK symbols of to-be-transmitted uplink control information for the first time, by 1 in an orthogonal cover code [1,j,−1,−j], to obtain a first part of a second data segment;
multiplying three QPSK symbols obtained by repeating the three QPSK symbols for the second time, by j in the orthogonal cover code [1,j,−1 j], to obtain a second part of the second data segment;
multiplying three QPSK symbols obtained by repeating the three QPSK symbols for the third time, by −1 in the orthogonal cover code [1,j,−1 j], to obtain a third part of the second data segment;
multiplying three QPSK symbols obtained by repeating the three QPSK symbols for the fourth time, by −j in the orthogonal cover code [1,j,−1 j], to obtain a fourth part of the second data segment; and sending, by a first terminal, the second data segment.

Embodiment 2

A communication method, comprising:
multiplying three QPSK symbols obtained by repeating three QPSK symbols of to-be-transmitted uplink control information for the first time, by 1 in an orthogonal cover code [1,−j,−1,j], to obtain a first part of a second data segment;
multiplying three QPSK symbols obtained by repeating the three QPSK symbols for the second time, by −j in the orthogonal cover code [1,−j,−1,j], to obtain a second part of the second data segment;
multiplying three QPSK symbols obtained by repeating the three QPSK symbols for the third time, by −1 in the orthogonal cover code [1,−j,−1,j], to obtain a third part of the second data segment;
multiplying three QPSK symbols obtained by repeating the three QPSK symbols for the fourth time, by j in the orthogonal cover code [1,−j,−1,j], to obtain a fourth part of the second data segment; and
sending, by a first terminal, the second data segment.

Embodiment 3

A communication method, comprising:
multiplying three QPSK symbols obtained by repeating three QPSK symbols of to-be-transmitted uplink control information for the first time, by 1 in an orthogonal cover code [1,−1,1,−1], to obtain a first part of a second data segment;
multiplying three QPSK symbols obtained by repeating the three QPSK symbols for the second time, by −1 in the orthogonal cover code [1,−1,1,−1], to obtain a second part of the second data segment;
multiplying three QPSK symbols obtained by repeating the three QPSK symbols for the third time, by 1 in the orthogonal cover code [1,−1,1,−1], to obtain a third part of the second data segment;
multiplying three QPSK symbols obtained by repeating the three QPSK symbols for the fourth time, by −1 in the orthogonal cover code [1,−1,1,−1], to obtain a fourth part of the second data segment; and
sending, by a first terminal, the second data segment.

Embodiment 4

A communication method, comprising:
multiplying three QPSK symbols obtained by repeating three QPSK symbols of to-be-transmitted uplink control information for the first time, by 1 in an orthogonal cover code [1,1,1,1], to obtain a first part of a second data segment;
multiplying three QPSK symbols obtained by repeating the three QPSK symbols for the second time, by 1 in the orthogonal cover code [1,1,1,1], to obtain a second part of the second data segment;
multiplying three QPSK symbols obtained by repeating the three QPSK symbols for the third time, by 1 in the orthogonal cover code [1,1,1,1], to obtain a third part of the second data segment;
multiplying three QPSK symbols obtained by repeating the three QPSK symbols for the fourth time, by 1 in the orthogonal cover code [1,1,1,1], to obtain a fourth part of the second data segment; and sending, by a first terminal, the second data segment.

Figure 9:
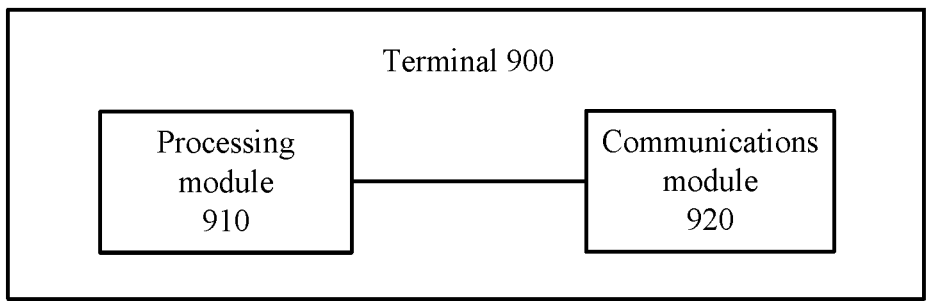
FIG. 9 is an example structural diagram of a terminal according to an embodiment of this application.

FIG. 9 is a schematic structural diagram of a terminal according to an embodiment of this application. It should be understood that the terminal 900 shown in FIG. 9 is only an example; and the terminal in this embodiment of this application may further include another module or unit, or may include modules with functions similar to those of modules in FIG. 9, or may not necessarily include all modules in FIG. 9.

A processing module 910 is configured to repeat to-be-transmitted uplink control information for N times to obtain a first data segment, where N is a positive integer.

The processing module 910 is further configured to determine an orthogonal cover code based on the quantity N of repetitions.

The processing module 910 is further configured to multiply the first data segment by the orthogonal cover code to obtain a second data segment.

A communications module 920 is configured to send the second data segment.

The terminal repeats the to-be-transmitted uplink control information for N times, so that frequency diversity gains of the to-be-transmitted uplink control information can be increased.

In addition, the terminal multiplies the to-be-transmitted uplink control information by the orthogonal cover code, so that the to-be-transmitted uplink control information can present a comb-like structure in frequency domain. In addition, the comb-like structure can be staggered from a frequency-domain comb-like structure obtained by multiplying uplink control information of another terminal by an orthogonal cover code, so that a plurality of terminals use a same time-frequency resource to transmit uplink control information, thereby increasing resource utilization.

In addition, the quantity of repetitions of the uplink control information of the terminal and the orthogonal cover code can be determined flexibly, so that the uplink control information can be transmitted more flexibly.

Optionally, the processing module 910 may be specifically configured to determine the orthogonal cover code based on the quantity N of repetitions and a correspondence between the quantity N of repetitions and the orthogonal cover code.

Optionally, a communications module 920 may be further configured to receive indication information sent by a network device, where the indication information is used to indicate N. The processing module 910 is further configured to determine N based on the indication information.

Optionally, the processing module 910 may be further configured to determine N based on uplink channel state information.

Optionally, the processing module 910 may be further configured to determine N based on a quantity M of symbols represented by constellation points of the to-be-transmitted uplink control information, where M is a positive integer.

Optionally, the processing module 910 may be specifically configured to determine a ratio of a quantity of subcarriers included in a first resource to M as N.

Optionally, the communications module 920 may be further configured to send indication information to the network device, where the indication information is used to indicate N.

Optionally, the communications module 920 may be specifically configured to send the second data segment on the first resource, where a third data segment is also sent on the first resource, and the third data segment is obtained by repeating uplink control information of a second terminal for K times, where K is not equal to N, and K is a positive integer.

The terminal shown in FIG. 9 can perform the steps in the communication method shown in FIG. 2. For brevity, details are not described herein again.

Figure 10:
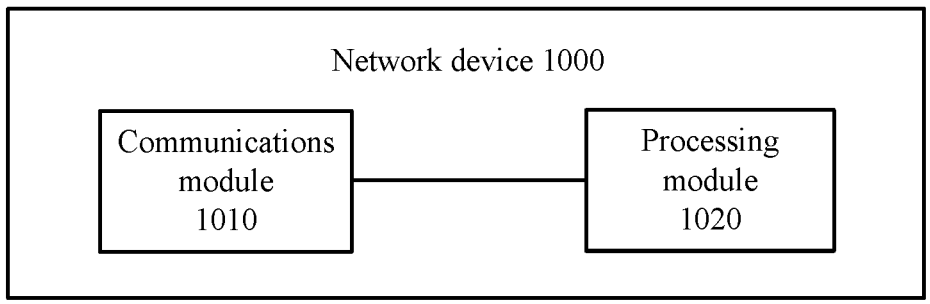
FIG. 10 is an example structural diagram of a network device according to an embodiment of this application.

FIG. 10 is a schematic structural diagram of a network device according to an embodiment of this application. It should be understood that the network device 1000 shown in FIG. 10 is only an example; and the network device in this embodiment of this application may further include another module or unit, or may include modules with functions similar to those of modules in FIG. 10, or may not necessarily include all modules in FIG. 10.

A communications module 1010 is configured to receive a second data segment sent by a first terminal, where the second data segment is obtained by the first terminal by processing a first data segment based on an orthogonal cover code, and the first data segment is obtained by repeating uplink control information of the first terminal for N times, where N is a positive integer.

A processing module 1020 is configured to determine a conjugated orthogonal cover code based on N.

The processing module 1020 is further configured to multiply the conjugated orthogonal cover code by the second data segment to obtain the first data segment.

The processing module 1020 is further configured to perform N rounds of deduplication processing on the first data segment to obtain the uplink control information of the first terminal.

The terminal repeats the to-be-transmitted uplink control information for N times, so that frequency diversity gains of the to-be-transmitted uplink control information can be increased. In addition, the first terminal multiplies the to-be-transmitted uplink control information by the orthogonal cover code, so that the to-be-transmitted uplink control information can present a comb-like structure in frequency domain. In addition, the comb-like structure can be staggered from a frequency-domain comb-like structure obtained by multiplying uplink control information of another terminal by an orthogonal cover code, so that a plurality of terminals use a same time-frequency resource to transmit uplink control information.

Optionally, the processing module 1020 may be specifically configured to determine the conjugated orthogonal cover code based on the quantity N of repetitions and a correspondence between the quantity N of repetitions and the conjugated orthogonal cover code.

Optionally, the communications module 1010 may be further configured to receive indication information sent by the first terminal, where the indication information is used to indicate N.

Optionally, the processing module 1020 may be further configured to determine N based on at least one of uplink channel state information of the first terminal and an uplink signal-to-noise ratio of the first terminal; and the communications module 1010 may be further configured to send indication information to the first terminal, where the indication information is used to indicate N.

Optionally, the communications module 1010 may be specifically configured to receive, on a first resource, the second data segment sent by the first terminal. The communications module 1010 may be further configured to receive, on the first resource, a third data segment sent by a second terminal; and the processing module 1020 may be further configured to perform conjugated orthogonal cover code processing and K rounds of deduplication processing on the third data segment to obtain uplink control information of the second terminal, where K is not equal to N, and K is a positive integer.

The network device shown in FIG. 10 can perform the steps in the communication method shown in FIG. 6. For brevity, details are not described herein again.

Figure 11:
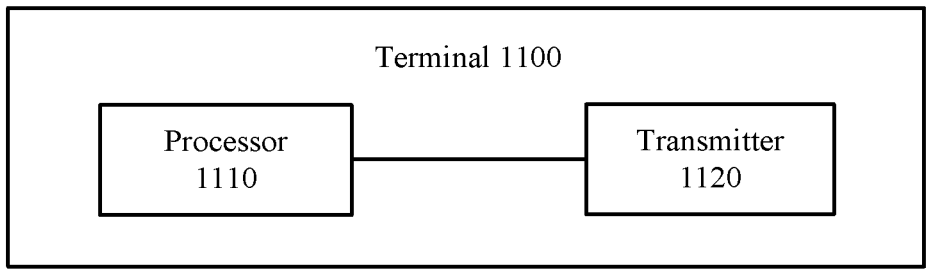
FIG. 11 is an example structural diagram of a terminal according to another embodiment of this application.

FIG. 11 is a schematic structural diagram of a terminal according to another embodiment of this application. It should be understood that the terminal 1100 shown in FIG. 11 is only an example; and the terminal in this embodiment of this application may further include another module or unit, or may include modules with functions similar to those of modules in FIG. 11, or may not necessarily include all modules in FIG. 11.

The processor 1110 may be configured to implement the operations or steps that can be implemented by the processing module 910 in FIG. 9, and a transmitter 1120 may be configured to implement the operations or steps that can be implemented by the communications module 920 in FIG. 9.

The terminal shown in FIG. 11 may further include a receiver, configured to receive information sent by another device. The receiver and the transmitter may be integrated together as a transceiver.

The terminal shown in FIG. 11 may further include a memory, configured to store program code executed by the processor. The memory may be integrated into the processor 1110.

Figure 12:
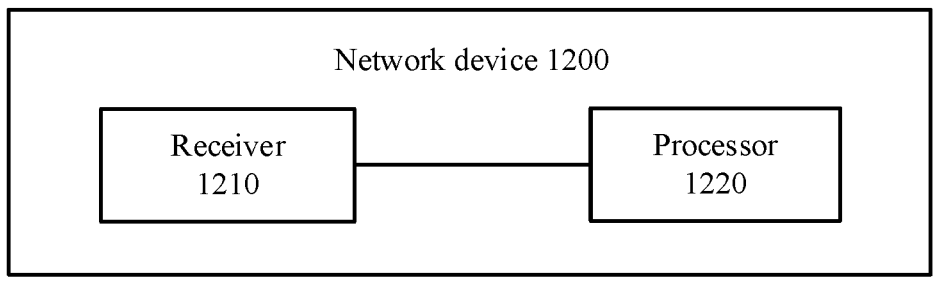
FIG. 12 is an example structural diagram of a network device according to another embodiment of this application.

FIG. 12 is a schematic structural diagram of a network device according to another embodiment of this application. It should be understood that the network device 1200 shown in FIG. 12 is only an example; and the network device in this embodiment of this application may further include another module or unit, or may include modules with functions similar to those of modules in FIG. 12.

The processor 1220 may be configured to implement the operations or steps that can be implemented by the processing module 1020 in FIG. 10, and a receiver 1210 may be configured to implement the operations or steps that can be implemented by the communications module 1010 in FIG. 10.

The network device shown in FIG. 12 may further include a transmitter, configured to send information to another device. The receiver and the transmitter may be integrated together as a transceiver.

The network device shown in FIG. 12 may further include a memory, configured to store program code executed by the processor. The memory may be integrated into the processor 1220.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, the procedure or functions according to the embodiments of this application are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), or a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
repeating, by a first terminal, to-be-transmitted uplink control information for a quantity N of repetitions to obtain a first data segment, wherein N is a positive integer, wherein N is determined based on a quantity M of symbols of the to-be-transmitted uplink control information, wherein M is a positive integer;

determining, by the first terminal, an orthogonal cover code based on the quantity N of repetitions;

multiplying, by the first terminal, the first data segment by the orthogonal cover code to obtain a second data segment; and sending, by the first terminal, the second data segment.

2. The communication method according to claim 1, wherein the orthogonal cover code is determined based on the quantity N of repetitions and a correspondence between the quantity N of repetitions and the orthogonal cover code.

3. The communication method according to claim 1, wherein a ratio of a quantity of subcarriers comprised in a first resource to M is determined as N.

4. The communication method according to claim 1, wherein the sending, by the first terminal, the second data segment comprises:

sending, by the first terminal on a first resource, the second data segment, wherein a third data segment is also sent on the first resource, and the third data segment is obtained by repeating uplink control information of a second terminal for K times, wherein K is not equal to N, and K is a positive integer.

5. A terminal, comprising
a processor; and
a transmitter,
wherein the processor is configured to:
repeat to-be-transmitted uplink control information for a quantity N of repetitions to obtain a first data segment, wherein N is a positive integer;
determine an orthogonal cover code based on the quantity N of repetitions, wherein the orthogonal cover code is determined based on the quantity N of repetitions and a correspondence between the quantity N of repetitions and the orthogonal cover code; and
multiply the first data segment by the orthogonal cover code to obtain a second data segment; and
wherein the transmitter is configured to send the second data segment.

6. The terminal according to claim 5, further comprising:
a receiver configured to receive indication information from a network device, wherein the indication information is used to indicate N;
wherein the processor is further configured to determine N based on the indication information.

7. The terminal according to claim 5, wherein N is determined based on uplink channel state information.

8. The terminal according to claim 5, wherein N is determined based on a quantity M of symbols of the to-be-transmitted uplink control information, wherein M is a positive integer.

9. The terminal according to claim 8, wherein a ratio of a quantity of subcarriers comprised in a first resource to M is determined as N.

10. The terminal according to claim 5, wherein the transmitter is configured to send the second data segment on a first resource, wherein a third data segment is also sent on the first resource, and the third data segment is obtained by repeating uplink control information of a second terminal for K times, wherein K is not equal to N, and K is a positive integer.

11. The terminal according to claim 5, wherein the quantity N of repetitions corresponds to N orthogonal cover codes, wherein the N orthogonal cover codes are:

$$[1, 1, 1, \ldots 1], \left[1, e^{j\frac{2}{M}\pi}, e^{j\frac{4}{M}\pi}, \ldots e^{j\frac{2(M-1)}{M}\pi}\right],$$

$$\left[1, e^{j\frac{4}{M}\pi}, e^{j\frac{8}{M}\pi}, \ldots e^{j\frac{4(M-1)}{M}\pi}\right], \ldots ,$$

$$\text{and } \left[1, e^{j\frac{2(M-1)}{M}\pi}, e^{j\frac{4(M-1)}{M}\pi}, \ldots e^{j\frac{2(M-1)^2}{M}\pi}\right].$$

12. The terminal according to claim 11, wherein N=4, the four orthogonal cover codes are: [1,1,1,1], [1,j,−1,−j],[1,−1, 1,−1], and [1,−j,−1,j].

13. A network device, comprising:
a receiver configured to receive a second data segment from a first terminal, wherein the second data segment is obtained based on processing a first data segment according to an orthogonal cover code, and wherein the first data segment is obtained based on repeating uplink control information of the first terminal for a quantity N of repetitions, wherein N is a positive integer; and
a processor configured to:
determine a conjugated orthogonal cover code based on N;
multiply the conjugated orthogonal cover code by the second data segment to obtain the first data segment; and
perform N rounds of deduplication processing on the first data segment to obtain the uplink control information of the first terminal.

14. The network device according to claim 13, wherein the conjugated orthogonal cover code is determined based on the quantity N of repetitions and a correspondence between the quantity N of repetitions and the conjugated orthogonal cover code.

15. The network device according to claim 13, wherein the receiver is further configured to receive indication information from the first terminal, wherein the indication information is used to indicate N.

16. The network device according to claim 13, wherein N is determined based on at least one of uplink channel state information of the first terminal and an uplink channel signal-to-noise ratio of the first terminal.

17. The network device according to claim 13,
wherein the receiver is configured to:
receive, on a first resource, the second data segment from the first terminal; and
receive, on the first resource, a third data segment from a second terminal; and
wherein the processor is further configured to perform conjugated orthogonal cover code processing and K rounds of deduplication processing on the third data segment to obtain uplink control information of the second terminal, wherein K is not equal to N, and K is a positive integer.

* * * * *

UNITED STATES PATENT AND TRADEMARK OFFICE
CERTIFICATE OF CORRECTION

PATENT NO. : 11,109,365 B2
APPLICATION NO. : 16/674239
DATED : August 31, 2021
INVENTOR(S) : Wu et al.

Page 1 of 1

It is certified that error appears in the above-identified patent and that said Letters Patent is hereby corrected as shown below:

In the Claims

Claim 11: Column 22, Line 9: "$[1, 1, 1, \ldots 1], \left[1, e^{j\frac{2}{M}\pi}, e^{j\frac{4}{M}\pi}, \ldots e^{j\frac{2(M-1)}{M}\pi}\right]$," should read --$[1,1,1,\ldots 1], \left[1, e^{j\frac{2}{M}\pi}, e^{j\frac{4}{M}\pi}, K\, e^{j\frac{2(M-1)}{M}\pi}\right]$,--.

Claim 11: Column 22, Line 10: "$\left[1, e^{j\frac{4}{M}\pi}, e^{j\frac{8}{M}\pi}, \ldots e^{j\frac{4(M-1)}{M}\pi}\right], \ldots$," should read --$\left[1, e^{j\frac{4}{M}\pi}, e^{j\frac{8}{M}\pi}, K\, e^{j\frac{4(M-1)}{M}\pi}\right], \ldots,$--.

Signed and Sealed this
Twelfth Day of July, 2022

*Katherine Kelly Vidal*

Katherine Kelly Vidal
*Director of the United States Patent and Trademark Office*